United States Patent [19]

Neeb et al.

[11] 3,776,691
[45] Dec. 4, 1973

[54] PROCESS FOR DYEING AND PRINTING TEXTILE MATERIALS CONTAINING ACID GROUPS WITH BASIC DYESTUFFS

[75] Inventors: Rudolf Neeb, Obertshausen; Eberhard Mundlos, Heusenstamm; Reinhard Mohr, Offenbach/Main, all of Germany

[73] Assignee: Farbwerke Hoechst Aktiengesellschaft vormals Meister Lucius & Bruning, Frankfurt/Main, Germany

[22] Filed: Apr. 21, 1972

[21] Appl. No.: 246,167

[30] Foreign Application Priority Data
Apr. 26, 1971 Germany.................. P 21 20 246.0

[52] U.S. Cl. ............... 8/177 AB, 260/266, 260/267
[51] Int. Cl............................................... D06p 3/76
[58] Field of Search ................. 8/177 AB; 260/266, 260/267

[56] References Cited
UNITED STATES PATENTS

| | | | |
|---|---|---|---|
| 466,826 | 1/1892 | Hepp ................................... | 260/266 |
| 3,253,877 | 5/1966 | Straley et al. ..................... | 8/177 AB |
| 3,580,947 | 5/1971 | Ikeda et al. ....................... | 260/267 X |

Primary Examiner—Leon D. Rosdol
Assistant Examiner—T. J. Herbert, Jr.
Attorney—Arthur G. Connolly et al.

[57] ABSTRACT

Process for the dyeing and printing of textile materials made from polymers or copolymers of acrylonitrile by using dyestuffs of the general formula

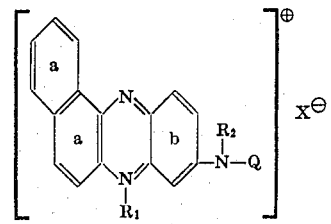

in which $R_1$ represents an alkyl, aralkyl, aryl or heterocyclic radical which may be substituted $R_2$ represents hydrogen or an alkyl or aralkyl radical which may be substituted, Q represents an aromatic or heterocylic radical which may be condensed with the benzene nucleus $b$, and X represents an anion and the benzene radicals $a$ and $b$ as well as the radical Q may contain further non-ionogenic substituents. The dyeings and prints thus obtained show a good fastness to light, wet processing, washing, fulling, over-dyeing, to chlorine, to perspiration and to carbonizing as well to decatizing, steaming, ironing, rubbing and to solvents.

7 Claims, No Drawings

PROCESS FOR DYEING AND PRINTING TEXTILE MATERIALS CONTAINING ACID GROUPS WITH BASIC DYESTUFFS

The present invention relates to a process for dyeing and printing of textile material containing acid groups with basic dyestuffs.

It is known that textile material consisting of polymers and copolymers of acrylonitrile can be dyed with phenazine dyestuffs. However, the dyeings so obtained in many cases have no sufficient fastness to light (cf. Melliand, Volume 39 (1958), pages 408 – 414).

Now, we have found that fast dyeings and prints are obtained on textile material containing acid groups by using dyestuffs of the general formula

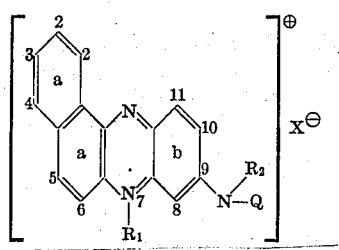

in which $R_1$ represents an alkyl, aralkyl, aryl or heterocyclic radical which may be substituted, $R_2$ represents hydrogen or an alkyl or aralkyl radical which may be substituted, Q represents an aromatic or heterocyclic radical which may be condensed with the benzene nucleus $b$, and X represents an anion and the benzene radicals $a$ and $b$ as well as the radical Q may contain further non-ionogenic substituents.

The radical Q is preferably a benzene or naphthalene radical which may contain, as non-ionogenic substituent, for example halogen atoms, alkyl, alkoxy, aralkyl, aralkoxy, aryl, aryloxy, azo, carboxylic acid ester, carboxylic acid amide which may be substituted, sulfonic acid amide, cyano, nitro, hydroxy, trifluoromethyl, alkyl-sulfonyl, arylsulfonyl, acyloxy, acylamino, alkylsulfonylamino or arylsulfonylamino groups, preferably lower alkyl, alkoxy and/or acyl groups which contain 1 to 4 carbon atoms, and halogen atoms, phenyloxy and/or trifluoro-methyl groups. Furthermore, the radical Q may contain annelled or linked heterocyclic rings. Further, Q may represent a heterocyclic ring system or the radical Q may be linked with the benzene radical $b$ under formation of a heterocyclic ring. As non-ionogenic substituents in the benzene nuclei $a$ and $b$, there enter into consideration, for example halogen atoms, alkyl, alkoxy, aralkyl, aralkoxy, aryl, aryloxy, azo, carboxylic acid ester, carboxylic acid amide which may be substituted, sulfonic acid amide, cyano, nitro, hydroxy, trifluoromethyl, alkylsulfonyl, arylsulfonyl, acyloxy, acylamino, alkylsulfonyl-amino or arylsulfonyl-amino groups.

The anion $X^-$ may be any desired simple or complex inorganic or organic anion, for example a radical of sulfuric acid or of the semi-esters thereof, or an arylsulfonic acid, of a hydrohalic acid or of another acid, for example of phosphoric acid, acetic acid, oxalic acid, lactic acid or tartaric acid or a chloro-zincate radical.

Dyestuffs of the formula

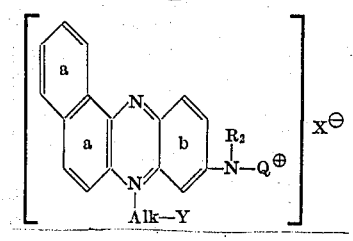

in which $R_2$, Q, X, $a$ and $b$ have the meanings given above, alk represents a straight chain or branched alkylene radical having up to 6 carbon atoms, and Y represents a halogen atom, a hydroxy, alkoxy, aryloxy, acyloxy, cyano, carboxylic acid amide, carboxylic acid ester, alkyl-sulfonic, sulfonic acid amide, acyl or dicarboxylic acid imide group or a phenyl or pyridine group, and dyestuffs of the formula

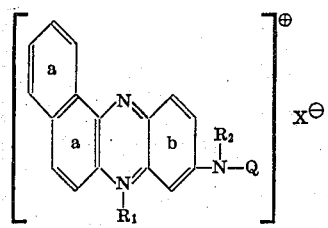

in which $R_1$ represents a phenyl group which may be substituted, and $R_2$, Q, X, $a$ and $b$ have the meanings given above are most suitable. As substituents in the phenyl group, there may be mentioned, for example halogen atoms, alkyl, alkoxy, aralkyl, aralkoxy, aryl, aryloxy, azo, carboxylic acid ester, carboxylic acid amide which may be substituted, sulfonic acid amide, cyano, nitro, hydroxy, trifluoromethyl, alkylsulfonyl, arylsulfonyl, acyloxy, acylamino, alkylsulfonylamino or arylsulfonylamino groups.

The dyestuffs used according to the present invention may be obtained according to known methods, for example by the reaction of β-naphthylamines monosubstituted at the nitrogen atom with 4-nitroso-diphenylamines or with the nitroso compounds of the corresponding heterocycles (cf. O. Fischer and E. Hepp, Berichte der Deutschen Chemischen Gesellschaft, Volume 29, pages 2752 et seq. (1896) and German Patent 97,211), or by the reaction of 9-halogenobenzo[a]phenazinium salts with aromatic amines (cf. Berichte der Deutschen Chemischen Gesellschaft, Volume 31, page 299 et seq. (1898) and Volume 33, page 1485 et seq. (1900)).

The dyeing is effected by treating the textile material in neutral or acidic, preferably acetic acid or mineral acid, baths, if desired in the presence of auxiliary agents and completing and finishing the dyeings so obtained in the usual manner. In general, the goods are entered into the dyebath at a temperature of about 40°–60° C and dyeing is effected at the boiling temperature. If desired, dyeing may also be effected under pressure above 100° C.

For dyeing textile material of polyacrylonitrile or the copolymers thereof, the dyestuffs are used together with the usual tickening agents and optionally printing auxiliaries and the dyestuffs are fixed in the usual manner by steaming.

Dyeing may also be effected in an organic solvent, for example in an aliphatic chlorohydrocarbon, in the presence of amines, amides, aminoxides or ammonium compounds and, if desired, emulsifiers.

For preparing the aqueous dyebaths and printing pastes, the dyestuffs may be used in the form of powders which may contain extenders, for example inorganic salts, dextrin and other additions. However, it is more advantageous to use concentrated aqueous solutions of the dyestuffs which are more easier to handle and which contain about 20 to 60 percent of dyestuff, one or several lower aliphatic carboxylic acids such as formic acid, acetic acid, propionic acid or lactic acid, and, if desired other additives such as water-soluble, polyhydric alcohols, the ethers or esters thereof, polyethers, aliphatic carboxylic acid amides, lactams, lactones, nitriles, dimethylsulfoxide, diacetone-alcohol, dioxane, tetrahydrofurane or urea and water.

For preparing the dyebaths which contain only organic solvents, for example chlorohydrocarbons, it is of advantage to use concentrated solutions which contain the dyestuff in the form of a free base or of a salt of a mono-basic organic acid, chlorohydrocarbons, organic acids and polar organic solvents.

As the textile material, there may be used fibers, filaments, flocks, fabrics and knit fabrics of polymers of acrylonitrile or of copolymers of acrylonitrile with other vinyl compounds, for example vinyl chloride, vinyl fluoride, vinylidene chloride, vinyl acetate of propionate, vinyl pyridine, vinyl-imidazole, vinylpyrrolidone, vinyl alcohol, acrylic or methacrylic acid esters or acrylamides, which contain acid groups introduced by the preparation. Further, there may be used acid modified polyacrylonitrile materials as those described in U.S. Pat. Nos. 2 837500 and 2 737501, as well as acid modified polyester fibers (cf. U.S. Pat. Nos. 3,018,272, 3,164,566, 3,164,567, 3,164,570, 3 166 531) and acid modified polyamide fibers (cf. U.S. Pat. Nos. 3,039,990, 3,184,436 and 3,454,351).

The dyeings and prints produced with the dyestuffs used according to the invention are distinguished by good fastness to light and to wet processing, by good fastness to washing, to fulling, over-dyeing, to chlorine, to perspiration and to carbonizing as well as by good fastness to decatizing, steaming, ironing, rubbing and to solvents.

The following Examples illustrate the invention:

EXAMPLE 1

A mixture of 15 parts by weight of 4-nitrosodiphenylamine, 11 parts by weight of N-phenyl-2-naphthylamine, 250 parts by weight of ethyl alcohol and 17 parts by weight of 36 percent hydrochloric acid was heated within 30 minutes to the boiling temperature. The whole was further boiled for 1 hour under reflux and the reaction mixture was then poured into 3,000 parts by weight of water having room temperature. The product that had precipitated was filtered off with suction and dried. 18 Parts by weight of the dyestuff of the formula

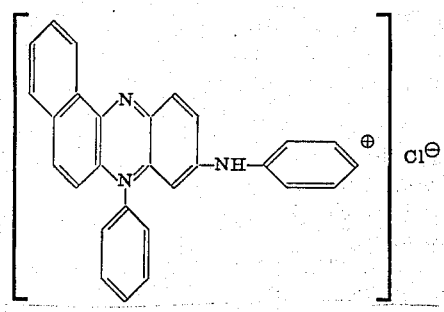

are obtained.

100 g of a pre-cleaned polyacrylonitrile staple fiber yarn were entered into a dyebath having a temperature of about 60° C and containing, per 3 liters of water, 1 g of crystallized sodium acetate and 5 g of calcined sodium sulfate, allowed to circulate for about 10 minutes and then, at 60° C, a solution of 1 g of dyestuff and 3 ml of 60 percent acetic acid in 1 liter of water was added. The temperature of the dyebath was then relatively rapidly raised to 85° C, then slowly to 100° C; the temperature of the dyebath should rise within 3 – 4 minutes each by 1° C. When the boiling temperature was reached, dyeing was effected for 1 – 1 ½ hours, after which time the bath was almost completely exhausted. It was then cooled to about 70° C, the dyed goods were rinsed warm and cold and dried. A navy blue dyeing having very good fastness to light and to wet processing was obtained.

EXAMPLE 2

5 g of the dyestuff of the formula

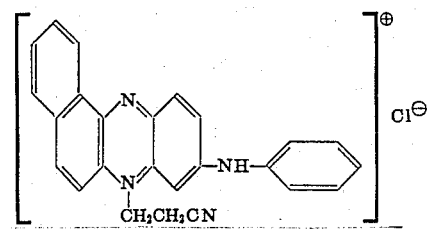

were pasted up with 15 ml of 60 percent acetic acid and dissolved in 1 liter of boiling water. This solution was poured into a dyebath which contained, per 5 liter of water having 60° C, 1.2 g of a dispersant of the alkylaryl-polyglycol ether type, 5 g of crystallized sodium acetate and 50 g of anhydrous sodium sulfate.

A pre-cleaned cross-wound bobbin containing 500 g of acid modified polyester fiber yarn was entered into the dyebath, the dyebath was heated under alternate circulation of the bath to 85° C and the temperature was slowly raised to 100° C. Dyeing was then effected for 1 – 1 ½ hours under alternatingly changing the direction of the bath, after which time the bath was largely exhausted. The dyebath was then cooled to about 70° C, the dyed material was rinsed warm and cold and dried.

A reddish dark blue dyeing having very good fastness to light and to wet processing was obtained.

EXAMPLE 3

20 g of the dyestuff

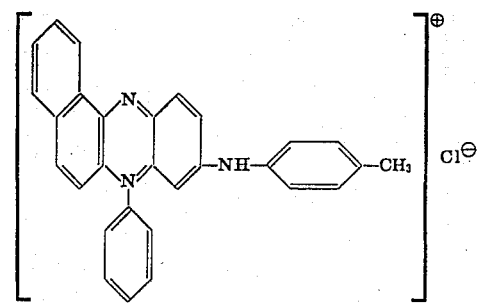

were dissolved hot with 50 g of β,β'-dioxydiethylsulfide, 30 g of cyclohexanol, 25 g of 60 percent acid and 425 g of water and the solution was stirred into 450 g of a crystal rubber thickener paste (1 : 2).

Polyacrylonitrile fabric was printed with this paste, dried, steamed for ½ hour under a pressure of 0.2 atmosphere gauge and then rinsed. The fabric was then soaped at 50° C with 1 g of a condensation product of oleic acid and methyl-taurine per liter of water, rinsed and dried.

A reddish dark blue print having very good fastness to light and to wet processing was obtained. The following Table lists other dyestuffs which may be used according to the invention and the shades obtained with them on polyacrylonitrile fibers:

trogen atom, and X represents an anion and the benzene rings a and b as well as the group Q may contain further non-ionogenic substituents.

2. A process as claimed in claim 1, wherein the dyestuffs have the formula

| $R_1$ | $R_2$ | Q | Substituents in the benzene nuclei a and b | $X^\ominus$ | Shade |
|---|---|---|---|---|---|
| Methyl | Hydrogen | Phenyl | | $Cl^\ominus$ | Dark blue. |
| Ethyl | do | do | | $Cl^\ominus$ | Do. |
| Butyl | do | do | | $HSO_4^\ominus$ | Do. |
| β-hydroxyethyl | do | do | | $HSO_4^\ominus$ | Do. |
| β-chloroethyl | do | do | | $Cl^\ominus$ | Do. |
| β-acetoxyethyl | do | do | | $H_2PO_4^\ominus$ | Do. |
| Benzyl | do | do | | $Cl^\ominus$ | Do. |
| 4-chlorophenyl | do | do | | $Cl^\ominus$ | Do. |
| 4-methylphenyl | do | do | | $Br^\ominus$ | Do. |
| 2-methylphenyl | do | do | | $Cl^\ominus$ | Do. |
| 4-methoxyphenyl | do | do | | $ZnCl_3^\ominus$ | Do. |
| Phenyl | do | 4-ethoxyphenyl | | $Cl^\ominus$ | Do. |
| Do | do | Phenyl | 11-methoxy | $Cl^\ominus$ | Do. |
| Do | Methyl | 4-ethoxyphenyl | | $Cl^\ominus$ | Do. |
| 2,5-dimethoxyphenyl | Hydrogen | Phenyl | | $Cl^\ominus$ | Do. |
| 2,4-dimethoxyphenyl | do | do | | $Cl^\ominus$ | Do. |
| Phenyl | do | 4-methoxyphenyl | | $Cl^\ominus$ | Do. |
| Do | do | 2,5-dimethylphenyl | | $Cl^\ominus$ | Do. |
| Do | do | 4-chlorophenyl | | $Cl^\ominus$ | Do. |
| Do | do | 3,4-dichlorophenyl | | $Cl^\ominus$ | Do. |
| Do | Methyl | Phenyl | | $Cl^\ominus$ | Do. |
| Do | Ethyl | do | | $Cl^\ominus$ | Do. |
| β-cyanoethyl | Hydrogen | 2,5-dimethoxyphenyl | | $HSO_4^\ominus$ | Do. |
| Do | do | 4-ethoxyphenyl | | $HSO_4^\ominus$ | Do. |
| Do | do | 4-phenoxyphenyl | | $Cl^\ominus$ | Do. |
| 4-ethoxyphenyl | do | Phenyl | | $Cl^\ominus$ | Do. |
| Methyl | do | do | 1-hydroxy | $Cl^\ominus$ | Greenish blue. |
| Do | do | do | 4-hydroxy | $Cl^\ominus$ | Blue. |
| Do | do | do | 2-methylamino | $Cl^\ominus$ | Reddish blue. |
| Do | do | do | 2-amino | $Cl^\ominus$ | Do. |
| Do | do | do | 2-hydroxy | $Cl^\ominus$ | Violet. |
| Do | β-hydroxyethyl | do | | $Cl^\ominus$ | Dark blue. |
| Cyclohexyl | Hydrogen | do | | $Cl^\ominus$ | Do. |
| 3-methoxypropyl | do | do | | $Cl^\ominus$ | Do. |
| Methyl | do | do | 3-methoxy | $Cl^\ominus$ | Do. |
| β-phenylethyl | do | do | | $Cl^\ominus$ | Do. |
| β-4'-pyridylethyl | do | do | | $Cl^\ominus$ | Do. |
| β-bromoethyl | do | 4-ethoxyphenyl | | $HSO_4^\ominus$ | Do. |
| β-ethoxyethyl | do | Phenyl | | $HSO_4^\ominus$ | Do. |
| β-phenoxyethyl | do | do | | $Cl^\ominus$ | Do. |
| β-propionyloxyethyl | do | do | | $Cl^\ominus$ | Do. |
| β-carbamoylethyl | do | do | | $Cl^\ominus$ | Do. |
| β-carbethoxyethyl | do | 4-methoxyphenyl | | $Cl^\ominus$ | Do. |
| β-phthaloylimido-ethyl | do | Phenyl | | $Cl^\ominus$ | Do. |
| β-succinyl-imido-ethyl | do | do | | $Cl^\ominus$ | Do. |
| 4-ethoxyphenyl | do | do | | $ZnCl_3^\ominus$ | Do. |
| 4-carbethoxyphenyl | Methyl | do | | $Cl^\ominus$ | Do. |
| 4-carbamoylphenyl | Hydrogen | 4-methoxyphenyl | | $Cl^\ominus$ | Do. |
| 4-sulfamoylphenyl | do | Phenyl | | $Cl^\ominus$ | Do. |
| 4-methylsulfonylphenyl | do | do | | $Cl^\ominus$ | Do. |
| 4-cyanophenyl | do | do | | $Br^\ominus$ | Do. |
| 3-hydroxyphenyl | do | do | | $Cl^\ominus$ | Do. |
| 3-trifluoromethylphenyl | do | do | | $Cl^\ominus$ | Do. |
| 4-ethoxyphenyl | β-hydroxyethyl | do | | $ZnCl_3^\ominus$ | Do. |

We claim:
1. A process for the dyeing and printing of textile materials made from polymers of acrylonitrile, which comprises applying to said textile materials dyestuffs of the formula

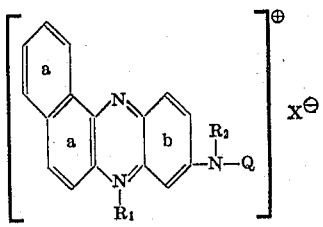

in which $R_1$ represents a lower alkyl, aralkyl, aryl or heterocyclic group which may be substituted, $R_2$ represents hydrogen or a lower alkyl or aralkyl group which may be substituted, Q represents an aromatic group or forms a heterocyclic ring with the adjacent nitrogen atom, and X represents an anion and the benzene rings a and b as well as the group Q may contain further non-ionogenic substituents.

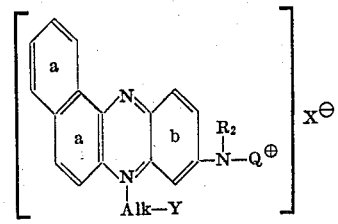

in which alk represents a straight chain or branched alkylene group having up to 6 carbon atoms, Y represents a halogen atom, a hydroxy, alkoxy, aryloxy, acyloxy, cyano, carboxylic acid amide, carboxylic acid ester, alkyl-sulfonic, sulfonic acid amide, acyl or dicarboxylic acid imide group or a phenyl or pyridine group, $R_2$ represents hydrogen or a lower alkyl or aralkyl group which may be substituted, Q represents an aromatic group or forms a heterocyclic ring with the adjacent nitrogen atom, and X represents an anion and the benzene rings a and b as well as the group Q may contain further non-ionogenic substituents.

3. A process as claimed in claim 1, wherein the dyestuffs have the formula

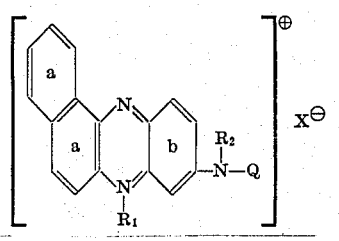

in which $R_1$ represents a phenyl group which may be substituted, $R_2$ represents hydrogen or a lower alkyl or aralkyl group which may be substituted, Q represents an aromatic group or forms a heterocyclic ring with the adjacent nitrogen atom, and X represents an anion and the benzene rings *a* and *b* as well as the group Q may contain further non-ionogenic substituents.

4. A process as claimed in claim 1, wherein the dyestuff has the formula

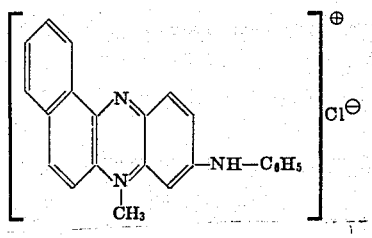

5. A process as claimed in claim 1, wherein the dyestuff has the formula

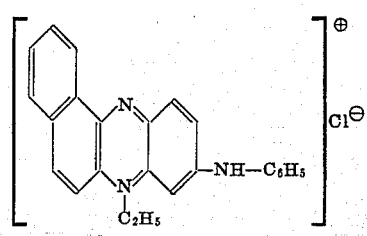

6. A dyestuff as claimed in claim 1, wherein the dyestuff has the formula

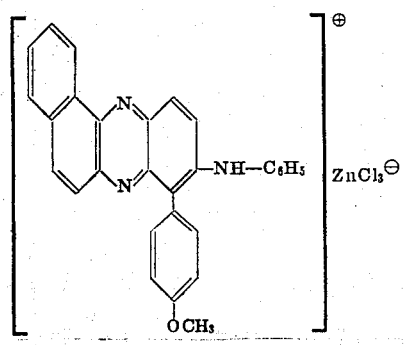

7. A dyestuff as claimed in claim 1, wherein the dyestuff has the formula

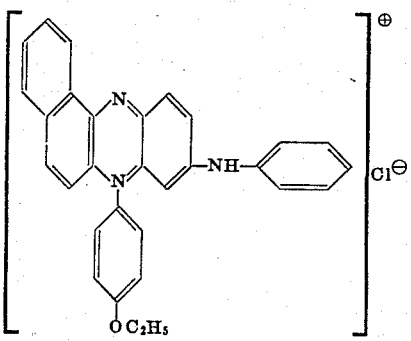

* * * * *